UNITED STATES PATENT OFFICE.

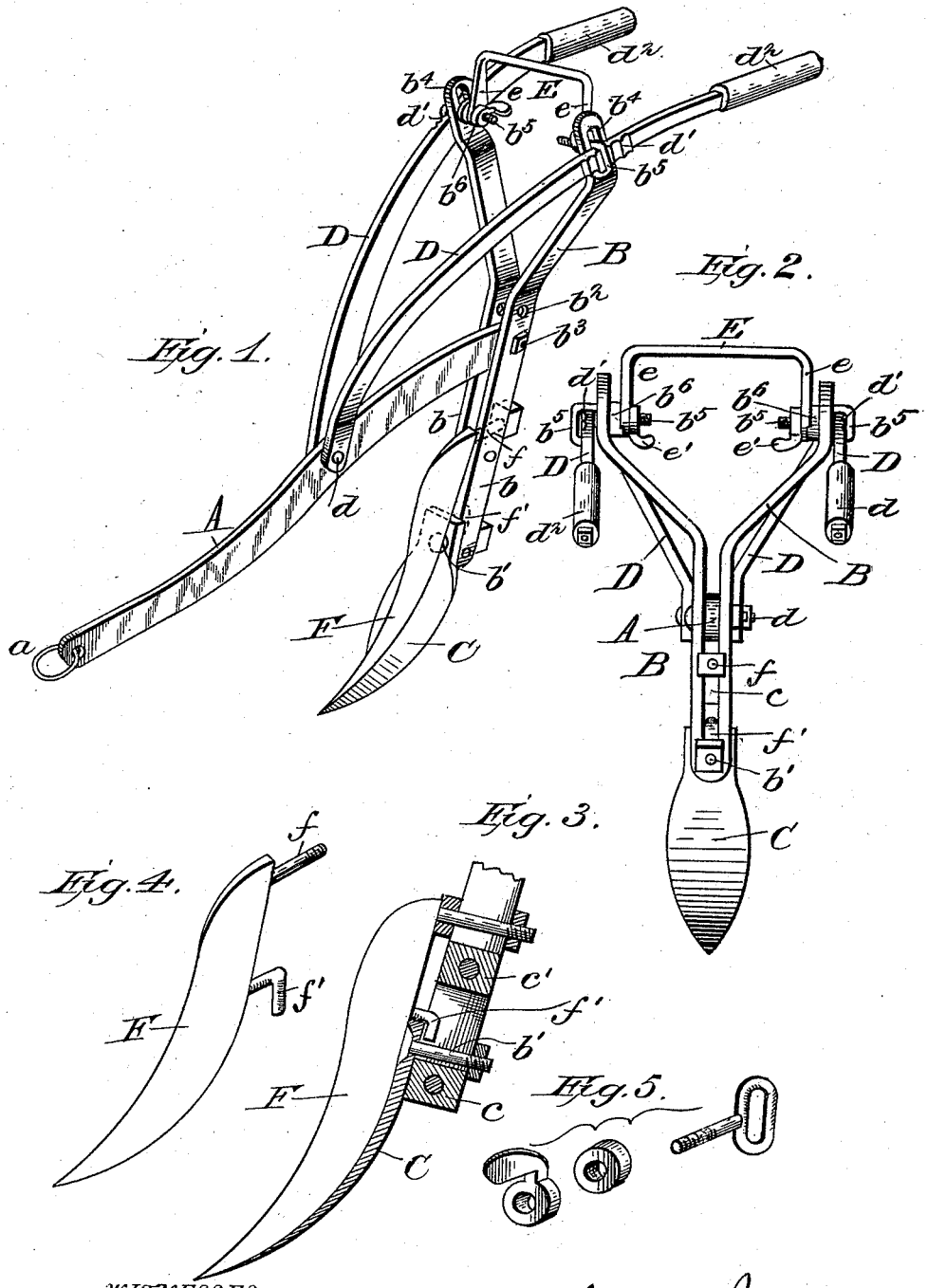

ASA GRAY, OF STACY, TENNESSEE.

PLOW.

SPECIFICATION forming part of Letters Patent No. 534,790, dated February 26, 1895.

Application filed August 28, 1894. Serial No. 521,544. (No model.)

*To all whom it may concern:*

Be it known that I, ASA GRAY, a citizen of the United States, residing at Stacy, in the county of Hawkins and State of Tennessee, have invented certain new and useful Improvements in Plows; and I do hereby declare the following to be a full, clear, and exact description of the invention, such as will enable others skilled in the art to which it appertains to make and use the same.

My invention relates to improvements in plows, and has for its object to produce a plow that will be cheap and durable in construction, and efficient in operation.

The invention will first be described in connection with the accompanying drawings, and then particularly pointed out in the claims.

In the drawings, Figure 1 is a perspective view of a plow embodying my invention. Fig. 2 is a rear end view of the same. Fig. 3 is a vertical longitudinal section of part of the standard and shovel. Figs. 4 and 5 are detail views.

Referring to the drawings, A is a plow beam preferably curved as shown and provided with a clevis or draft ring, $a$. The rear end of the plow beam is arranged in the fork of a plow standard B having two branches, $b$, the lower end of the standard being composed of two parallel bars, integral with the branches $b$, said bars being rigidly bolted or riveted together below the plow beam, the rivets passing through lugs $c$, $c'$ located between said bars and leaving two slotted apertures through the lower one of which passes a bolt $b'$ which holds in place the shovel C. The rear end of the plow beam is provided with a bolt hole arranged to register with either of two pairs of holes $b^2$ passing through the branches $b$, a bolt $b^3$ being passed through the registering bolt holes, whereby the plow beam is pivotally attached to the standard B. The top ends of the branches are preferably curved as shown and are each provided with a slot $b^4$. Through each slot passes a loop-headed bolt, $b^5$, provided with a washer $b^6$, these washers being inside the branches $b$. Through the loops of the bolts $b^5$ are passed a pair of handle bars D whose forward ends are pivotally attached to the plow beam by means of a bolt $d$ passing through the ends of the handle bars and through the plow beam. On the sides of the handles at the junction of the branches $b$, I provide a series of notches $d'$ in which the loop-headed bolts may be adjusted and secured. The handle bars at their other ends, are provided with handles, $d^2$.

E is a cross brace having its ends $e$ bent downward and provided with bolt holes which are placed over the inner ends of the loop-headed bolts, $b^5$, next to the washers $b^6$, being held in place and clamped as desired by wing or lever nuts $e'$, as will be fully understood from the drawings.

A screw threaded bolt projecting from the rear upper end of the colter F, passes through the aperture in the standard B, above the lug $c'$. Also from the rear of the colter, and about one third of its length, projects an L-shaped hook $f'$ that engages the upper end of the shovel C. The bolt is provided with a nut that bears against the rear of the standard, thereby holding the colter firmly in place on the shovel.

It will be obvious that in my improved plow by loosening the wing nuts $e'$ the loop bolts will be slackened so that the standard B may be swung on its pivotal point at the bolt $b^3$ thus adjusting the angle which the shovel makes with the ground, also raising or lowering the handle bars D and at the same time, either increasing or decreasing the vertical distance between the plow point and the line of draft. By screwing up the wing nuts $e'$ the loop-headed bolts enter the desired notch in the handle bars and clamp the same securely and firmly against the standard and hold the plow rigidly in its adjusted position. By this construction the plow may be arranged to run at various depths in the ground or to suit varying heights of users.

The colter F serves to cut the sod or roots in the usual manner as is well known, and by my novel method of attachment, it is held firmly against the plow shovel without being bolted to the latter, thus avoiding all the labor and trouble necessary in drilling a hole or a series of holes in the plow shovel and colter, which are usually of cast steel.

By having two pairs of holes through the branches, the rear end of the plow beam may be adjusted up and down on the standard.

Having thus fully described my invention, what I claim as new, and desire to secure by Letters Patent, is—

1. The combination in a plow, of a plow beam, a standard adjustably pivoted to the rear end of the plow beam, the said standard consisting of two metal bars slotted near their upper ends and rigidly attached to each other near their lower ends by means of interposed lugs and bolts passing through the bars and lugs; a pair of curved handle bars pivoted to the plow beam at their front ends and provided with handles at their rear ends and serrations on the handles, a pair of loop headed screw bolts passed through the slots in the standards, the loops adjustably engaging the serrations on the handle bars whereby the latter may be raised or lowered to adjust the plow beam, all substantially as described and shown.

2. The combination in a plow, provided with an adjustable beam, adjustable handle bars, a bifurcated standard provided with slots near its upper ends and apertures near its lower end, and a shovel attached to the standard, of a colter that is removably attached to the standard and shovel, by means of a screw threaded bolt and an L-shaped hook projecting from its rear side, all substantially as described and shown.

In testimony whereof I affix my signature in presence of two witnesses.

ASA GRAY.

Witnesses:
A. F. SIMPSON,
L. C. HENARD.